Jan. 23, 1962  A. J. ESHNER ET AL  3,018,193
PRECISION THICKNESS CONTROL FOR VACUUM DEPOSITION OF
TITANIUM AND OTHER METALS FOR OPTICAL SURFACES
Filed Aug. 13, 1958
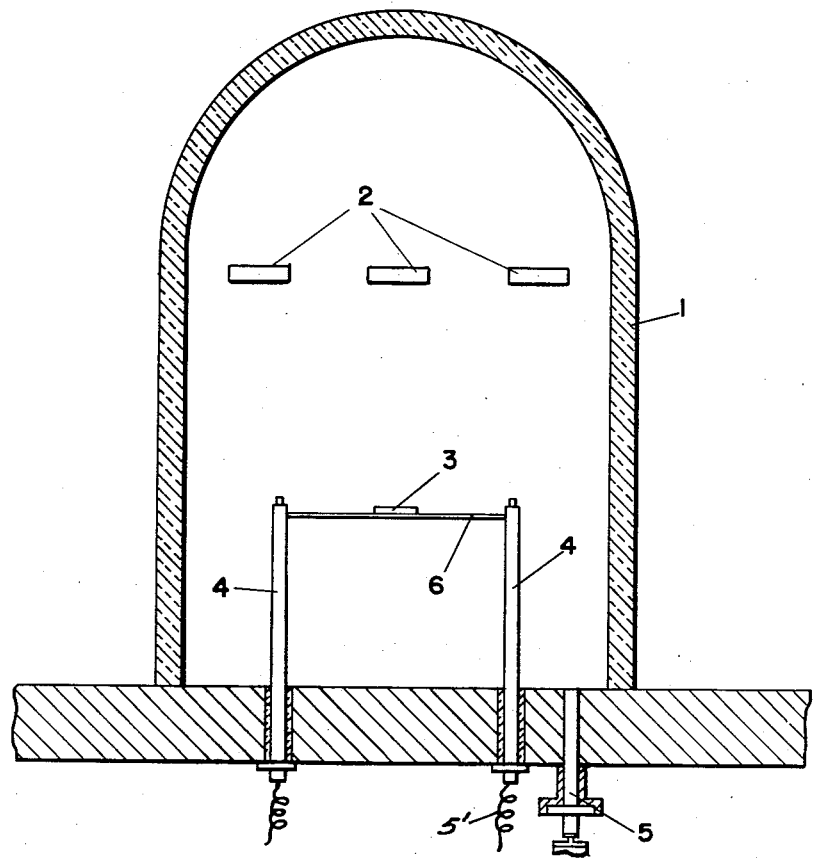
INVENTORS
ALLEN J. ESHNER
RAYMOND W. BOYDSTON

United States Patent Office 3,018,193
Patented Jan. 23, 1962

3,018,193
PRECISION THICKNESS CONTROL FOR VACUUM DEPOSITION OF TITANIUM AND OTHER METALS FOR OPTICAL SURFACES
Allen J. Eshner, 901 Brighton St., Philadelphia, Pa., and Raymond W. Boydston, 1306 Prospect Drive, Kynlyn Apartments, Wilmington, Del.
Filed Aug. 13, 1958, Ser. No. 757,172
2 Claims. (Cl. 117—107)
(Granted under Title 35, U.S. Code (1952), sec. 266)

The invention described herein may be manufactured and used by or for the Government for governmental purposes, without the payment of any royalty thereon.

This invention relates to the coating of certain metals having a desirable reflective index upon optical surfaces.

The object of this invention is to provide an economical and non-optical method for precise control of the thickness of the metal coating on optical objects.

The prior art has experienced many difficulties in controlling the thicknesses of these coatings. One way was accomplished by focusing a light upon the surface being coated, the light was then reflected or transmitted from the surface to a photoelectric cell. The incident light generated electrical energy which is proportional to the illumination. The current so generated was measured by a galvanometer which measured the amount of reflectance. The reflectance or transmission was directly proportional to the film thickness as a result of which the thickness could be controlled. Besides being more expensive, complex and elaborate, this means of controlling the thickness often is not as accurate and precise as the present invention which is able to obtain coatings that are exactly reproduceable. In the present invention the control of the film thickness is done by means of accurately weighing the starting material on an analytical balance before placing the metal to be vaporized in a bell jar and evaporating to dryness. A further advantage is found in the fact that the coating is accomplished very quickly taking a minor fraction of a second in operating time. This preserves the filament, which supports the metal charge, from attack by the metal by rapidly vaporizing it whereby the liquid phase appears to be avoided. As a consequence, a very annoying condition of frequent filament breakage is avoided. This often occurs during the evaporation necessitating recleaning or repolishing of expensive optics.

A specified amount of titanium ribbon is weighed upon a tungsten strip or boat. This weight is very critical as the thickness of the titanium film is directly proportional to the weight of metal initially weighed on the analytical balance. This in turn determines the reflectance or transmission of the sample. The thickness of the film deposited is plotted against the original weight of titanium on a graph. It then becomes a simple operation to consult the graph in order to see how large a sample is required to be weighed in order to yield a desired film thickness.

Looking at FIG. 1, a specific weight of titanium ribbon 3 is weighed on the tungsten boat 6. The filament is inserted between the two insulated posts 4 which are conencted to power leads 5'. The gas is then exhausted from the bell jar through a conduit 5 until the pressure is lower than $5\times10^{-5}$ mm. of mercury. Heat is applied and is controlled by means of a variac or other such instrument. The energy requirement for subliming titanium which requires a temperature of 5,000° C. is about 300 amps. and 5 volts.

The temperature is critical only to the extent that it has to be appreciably higher than the evaporation point for the metal that is being coated. This temperature must be attained almost instantaneously so as to give a sublimation effect or appearance to the metal. In seemingly bypassing the liquid state of metal to be coated, it prevents the metal from spattering, outgasing or reacting with the boat which would take place if it were molten. In this way any loss of the metal into the boat is prevented.

The surfaces 2 to be coated are placed a distance of over fifteen inches from the firing source. The sample is then fired in an explosive manner. The molecules of gaseous metal are thrust in all directions, they travel evenly since in the vacuum there is no bombardment with air or other gaseous molecules. As a result the surfaces will all be uniformly coated. After the firing, air is permitted to enter the bell jar, the optical surfaces are taken out, and placed in an oven whose temperature is 450° F. at the start after which it is immediately increased to 820° F.

The metal is oxidized to the oxide of the metal which is a dielectric film. The optical significance of dielectric films of titanium dioxide, with their very high refractive index, unusual physical and chemical durability, and freedom from light absorption losses has made titanium dioxide very desirable for the coating of optical devices. By the term "subliming" is meant the appearance of no liquid phase due to the rapidity of change from the solid state and the freedom from objectionable characteristics of a liquid state such as spatter.

We claim:
1. A process for depositing a titanium film of predetermined thickness with readily reproducible close approach to accuracy which comprises supporting a weighed amount of discontinuous ribbon of titanium upon an electrical resistance element of tungsten, exhausting gas from around said titanium and its support to a pressure lower than about $5\times10^{-5}$ millimeters of mercury, electrically heating said electrical resistance element and said titanium supported thereby to a temperature well above the boiling temperature of titanium to vaporize the titanium rapidly to avoid the appearance of any liquid state and any spatter in the titanium, but below the boiling temperature of the tungsten support, and depositing gaseous molecules of titanium upon solid supporting optical surfaces all parts of which to be coated are a substantially uniform distance for gaseous molecules of titanium to travel while maintaining the heating circuit through the tungsten support closed in such a manner that the titanium appears to be vaporized in an explosive manner in about a minor fraction of a second.

2. A process according to claim 1 which includes breaking the vacuum after subliming and depositing the titanium, removing the titanium coated optical surfaces and placing them in an oven heated to about 450° C. and then heating said surfaces to about 820° C. to oxidize the deposited film of titanium.

References Cited in the file of this patent
UNITED STATES PATENTS
2,628,921   Weinrich _____ Feb. 17, 1953
FOREIGN PATENTS
702,937   Germany _____ Feb. 24, 1941
OTHER REFERENCES
Faraday: Royal Society of London Philosophical Transactions, vol. 147 (1857), pages 145–181, page 152 relied on.
Conn: Physical Review, vol. 79 (1950), page 213.